Jan. 30, 1962  J. F. VASSELIN  3,019,004
METHOD AND APPARATUS FOR FLAME CUTTING MINERAL
BODIES AND OTHER MATERIAL
Filed Nov. 26, 1958  3 Sheets-Sheet 1

INVENTOR.
BY  John F. Vasselin
ATTORNEY

Jan. 30, 1962            J. F. VASSELIN           3,019,004
METHOD AND APPARATUS FOR FLAME CUTTING MINERAL
BODIES AND OTHER MATERIAL

Filed Nov. 26, 1958           3 Sheets-Sheet 2

INVENTOR.

BY   John F. Vasselin

ATTORNEY

United States Patent Office 3,019,004
Patented Jan. 30, 1962

3,019,004
METHOD AND APPARATUS FOR FLAME CUTTING MINERAL BODIES AND OTHER MATERIAL
John F. Vasselin, Westford, Mass., assignor to H. E. Fletcher Co., West Chelmsford, Mass., a corporation of Massachusetts
Filed Nov. 26, 1958, Ser. No. 776,498
4 Claims. (Cl. 262—3)

This invention relates to a method of flame working mineral substances such as granite and other spallable rock bodies. More particularly, the invention is concerned with a form of flame cutting which may be conveniently referred to as flame "chanelling" wherein a vertical channel is cut in an exposed vertical face of granite or other rock. The present application is a continuation-in-part of my co-pending application Serial No. 515,597, filed June 15, 1955, now abandoned.

It is a chief object of this invention as disclosed in the present application and the co-pending application noted to provide a method of efficient flame working specifically designed for carrying out channelling operations.

In a conventional channelling of a block of parent ledge to carry out dimension granite quarrying, i.e. to free a relatively large mass which is to be divided into smaller sizes suitable for further processing, it is required either that the block be entirely freed from the main constitutent body of the quarry or, at least, that the sides of the block be exposed. This involves making vertical cuts of adequate width for further processing. To make such vertical cuts, pneumatic drills are commonly used mounted on a channel bar. A series of closely spaced vertical holes is drilled to the depth of the desired channel and the intervening webs or braces between the holes are removed by broaching. An alternate method is to use a core drill to form the line of vertical holes.

More recently there has been brought into use a device commonly referred to as a flame jet or flame drill to take the place of a core drill. Such a device requires the burning of large quantities of fuel in the presence of an oxidant such as oxygen and, as this involves a high cost, there can only be justification for using a jet where an exceeding high efficiency is realized in terms of rate of removal of material per unit cost of fuel burned.

The flame jet has been successfully used in piercing a round hole by supporting a flame jet in a vertically disposed position and allowing the flame jet to descend as a hole is formed and deepened. It has been commonly understood by those skilled in this flame drilling art that efficiency of cutting, from the standpoint of a high rate of removal of material, results from the drill working in a hole in such a manner that effluent gases prevent atmospheric air from coming down the hole and attenuating the flame.

Because of this highly important efficiency requirement it was regarded as obvious that moving a flame jet against a vertical exposed face of a rock body would be inefficient and expensive and, therefore, prohibitive. This is borne out somewhat by the fact that supporting a flame jet in a vertically suspended position adjacent to an exposed vertical face will produce no worthwhile cutting effect of commercial significance and, similarly, if the flame jet is supported in a position such that it extends directly at right angles against an exposed face and then moved, ineffective cutting is found to take place. As a result of these factors no one, so far as I am aware, up to the time of filing of my co-pending application noted above, had successfully operated a flame jet to obtain an efficient channelling operation.

As disclosed in my co-pending application, I have discovered that efficient flame channelling may be accomplished by moving a flame jet upwardly along an exposed vertical face if the flame jet is supported at a proper angle of inclination with respect to the vertical face. I have further determined, as also disclosed in my co-pending application noted, that a proper angle is one which lies in a relatively small range of angles of from about 15° to about 30° with respect to the normal.

This discovery originated with the idea that it might be possible to find a point where a moving flame jet, even though attenuated by atmospheric air and even though the flame was free to dissipate some of its energy uselessly backward into the channel, would nevertheless exert a sufficient spalling action to be of commercial significance from a channelling standpoint. However, the reasons underlying successful operation of a flame jet or channelling in this narrow range of angles were not discussed in the co-pending application referred to above and were not fully understood at the time of filing of this earlier application.

Since the date of filing of the earlier application, the method of flame channelling of the invention has been practiced commercially almost constantly by applicant's assignee and more has been learned about the manner in which the flame operates. I find that if I direct a flame jet at an angle of from about 15° to about 30° with respect to the normal, as represented by a vertical rock face, and then move the flame progressively upwardly along the rock face, I am enabled to set up a flow of effluent gases in a high velocity stream. This stream moves downwardly and then outwardly away from the vertical rock face with important inductive effects being created.

Thus, as the flame properly angled starts to cut into the bottom of a vertical face of rock to form a shallow channel, progressive spalling takes place. The natural stresses in the rock tend to become centralized along the innermost parts of the channelled section. These innermost parts are thereby rendered more susceptible to thermally induced stresses from the high thermal intensity of the flame. I have observed that the two sides of the channel, once they start to form, function somewhat in the nature of a conduit through which effluent gases, including the stream of products of combustion as well as the spalled particles, are momentarily confined and then swept away at high velocity.

There is in this way created at the flame region of high velocity low pressure, a condition which induces atmospheric air to flow rapidly downwardly and inwardly around the burner into the flame region to become mixed with the flame. I have learned that this flow of air has important consequences affecting the flame channelling operation in several different ways. One surprising consequence is that the induced atmospheric air flowing into the flame region attenuates the flame jet but does so in a controlled manner so that efficiency is not significantly reduced but is, on the contrary, either maintained or, in some instances, increased, as will hereinafter be described in greater detail. This condition generally lies between 15° and 30° of flame angulation.

Another important feature is that the induced air rushing into the channelled area from points above the burner, when the latter member is held at a correct angle, necessarily exercises a highly desirable cooling action on the burner while, at the same time, preventing any spalled material from flying outwardly and, thus, operator working conditions are significantly improved and the whole operation is simplified.

Still another important consequence of the induction of atmospheric air downwardly and around the burner is that an excess of atmospheric oxygen is continuously furnished at the flame combustion region which can be utilized to sustain a flame relatively rich in oil or other fuel components.

I have further discovered a novel technique and flame cutting apparatus for carrying out my improved method of cutting, in which the cutting in the channel is progressed along a line of advancement which causes a rearrangement of the natural compressive stress pattern in the rock so that the natural stresses are continuously shifted and concentrated substantially at the point of thermal stressing. As a result the natural stresses greatly augment the thermal stressing and this combined action greatly accelerates the rate of channel cutting.

I have still further found that I may detect and locate joint planes in the rock body in which the channel is being cut, and in particular the so-called bottom bed or horizontally extending joint plane which in many cases forms the bottom boundary of the desired channel cut. In the type of quarry in which these horizontal joint planes exist, quarrying is greatly expedited by quarrying to them as a boundary. Also the horizontal joint planes may have a tendency to terminate at one level and start again at another level and it is highly desirable to locate these irregularities and to channel to the desired joint plane.

This I find may be accomplished by causing rock body portions to become incandescent. Incandescence results from applying a source of heat at sufficiently high temperature to these portions, and I can then observe the incandescence through the open part of the vertical channel which I have already formed. The incandescence which is thus produced is due, I believe, to the fact that heat transfer cannot occur readily across the joint plane, and therefore the rock body portion immediate adjacent to the joint plane cannot conduct heat away as rapidly and thereby assumes a high enough temperature for incandescence to take place. These joint planes actually glow at a bright line in the rock body.

These and other features and objects are illustrated in the accompanying drawings in which.

Figure 8:
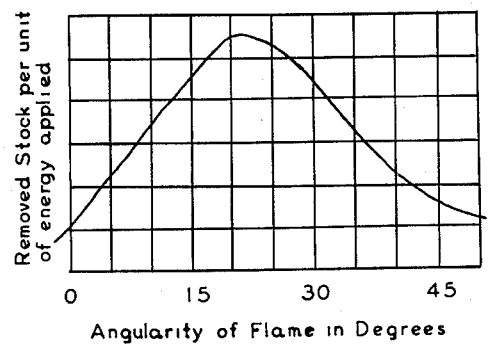
Figure 9:
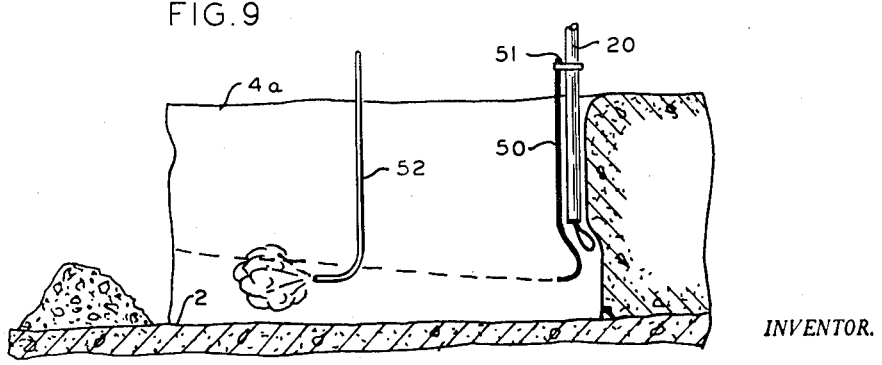

FIG. 8 is a diagrammatic view illustrating a curve representative of flame cutting efficiency; and FIG. 9 is a view illustrating the method of flame cutting of the invention at a point at which the cutting has progressed for an appreciable distance through the body of rock, and particularly noting conduit forming means for conducting away particles which have been separated from the granite body by thermal stresses.

Considering the method of the invention in greater detail, attention is directed to FIG. 8 wherein is illustrated a curve representing degrees of angularity of burner inclination plotted against removed rock particles per unit of energy expended. As will be apparent from an inspection of FIG. 8 there is a region of angularity values occurring between approximately 15 degrees and 30 degrees, measured with respect to the normal wherein the removal of particles can be carried out at a commercially significant rate. If the angle of flame cutting tool inclination approaches nearer to horizontal than 30 degrees, there is a zone of inefficiency due to turbulence of spent gases, and unsatisfactory carryoff or scouring action. If the angle of inclination of the cutting tool is less than about 15 degrees with respect to the normal, then there is a zone of inefficiency due to wasting of the flame energy, since there is inadequate impingement against the rock face. The curve in FIG. 8, it will be noted, rises sharply between these regions of inefficiency, the first of which may be considered to be at the right hand side of the curve and the second zone being at the left hand side of the curve.

Figure 1:
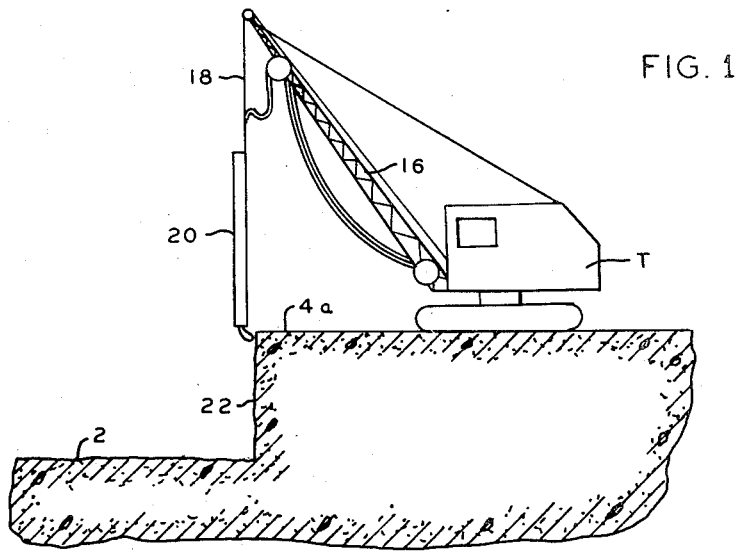
FIG. 1 is a diagrammatic view illustrating apparatus of the invention employed in carrying out my improved method of flame cutting.
Figure 3:
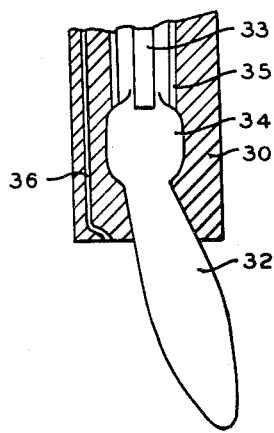
FIG. 3 is a fragmentary cross sectional view illustrating a portion of a special angled flame cutting tool of the invention.
Figure 2:
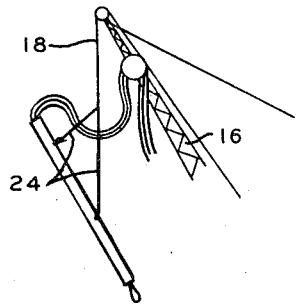
FIG. 2 is another diagrammatic view illustrating an alternate form of means of suspending a flame cutting apparatus.

FIGS. 1, 2 and 3 illustrate a flame cutting apparatus of a preferred form employed in carrying out the cutting operation above outlined. FIGS. 4, 5 and 6, and 7 and 9, in particular, show a portion of quarry rock to be cut in accordance with the invention.

Figure 4:
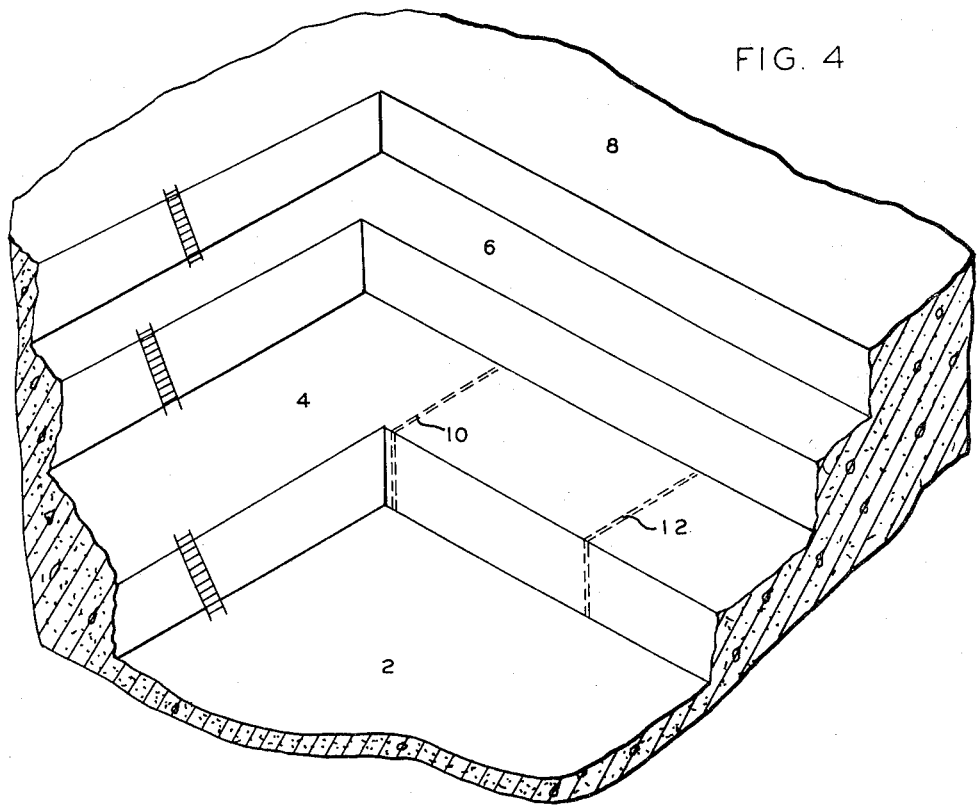
FIG. 4 is a fragmentary perspective view of a portion of a typical granite quarry from which a body of granite may be separated in accordance with the method of the invention.
Figure 5:
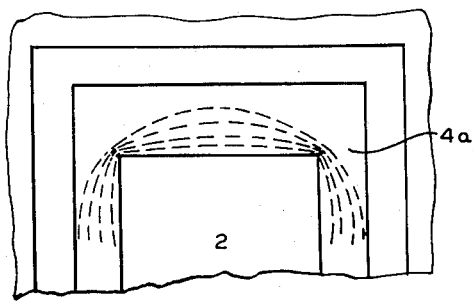
FIG. 5 is a diagrammatic view of the quarry section illustrated in FIG. 4 and indicating in dotted lines a pattern of natural compressive stresses which are known to occur in a granite quarry having a relieved vertical face of the general arrangement indicated.

As shown in FIG. 4, an open pit granite quarry is defined by a bottom or floor 2 from which extend upwardly tiers of rock layers as 4, 6 and 8. In FIG. 5 in the layer 4, numeral 4a indicates a particular block or section of granite which may be desired to be removed and thereafter further processed into specific granite products. For convenience, it may be assumed that the section 4a in FIG. 4 corresponds to the rock body in FIG. 1 and also in FIG. 7.

In accordance with my improved method of vertical channelling, I employ, for example, a flame cutting tool of the type in which fuel oil is atomized in a combustion chamber by a stream of oxygen. The mixture, when ignited, produces high velocity gases escaping at approximately 5,500 feet per second through a copper nozzle which shapes and directs a flame. The flame temperature is in the neighborhood of 5,000 degrees F. and water cooling of the copper nozzle is provided. This burner assembly includes an injector having a combustion chamber and nozzle and the assembly is housed in the forward end of a tube of steel having a length, for example, of 24 feet and a diameter of approximately 5 inches. In one typical form of injecting apparatus commonly employed in the art, fuel oil is delivered by a gear pump which raises pressure to 80 lbs. per square inch. Water is delivered at 50 lbs. per square inch and oxygen is supplied at 200 lbs. per square inch.

The parts of the flame burning apparatus above described may be of a conventional form and their operation is well known to those schooled in the flame working art. I further provide improved suspension means and a hoist mechanism for lowering the tool and raising it at a predetermined or controllable rate of speed. An important feature of the invention is special means for directing the flame in a predetermined position of angularity so that it may be gradually raised through a vertical path of travel while being maintained within a narrow range of angles with respect to the normal, of from about 15 degrees to about 30 degrees, as suggested in FIG. 2.

As noted in FIG. 1, I may provide a traction device T having a boom 16 and a hoist 18 for locating a flame cutting tool 20 in close proximity to the face 22 of the block of rock 4a. The hoist may be uniquely inclined on two pieces of a bridle arrangement 24 for holding the cutting tool in a position of angularity within predetermined limits of angularity as noted in the curve of FIG. 8 above described. This bridle arrangement is shown in FIG. 2.

In another desirable form of the invention, inclination of the cutting flame relative to the rock face 22 may be accomplished by a special nozzle arrangement of the invention illustrated in FIG. 3. A nozzle body 30 is specially formed with an inclined jet opening which directs the flame jet 32 at an angle of, for example, approximately 20 degrees, with respect to the normal as indicated in the drawing. Numeral 34 is the mixing chamber of the nozzle into which oxygen is led through a passageway 33, and fuel oil is introduced through a passageway 35. Special water jacketing passageways are indicated at 36. The flame cutting tool in FIG. 1 is intended to include and house a nozzle of the specific form shown in FIG. 3.

This angular type nozzle construction overcomes one serious difficulty which may be present in attempting to raise and lower a cutting tool supported in an inclined position by means of the bridle 24, for example. It will be appreciated that these vertical cuts may extend in a horizontal direction through the rock body 4a for a distance of as great as 20 feet or more, and as each vertical cut may be defined by irregularly spaced apart sides, it will be apparent that a tubular housing some 23 feet long, when disposed at an angle to the normal in such an irregularly formed cut, may come into interference with one or the other of the sides of the cut and prevent a proper raising and lowering action.

By constructing the nozzle with an angularly disposed outlet, it becomes possible to raise and lower the 23 foot length of tubular housing while held in a substantially vertically disposed position, so that there is little likelihood of interference between the tubular housing and the sides of the cut. A further virtue of the angled type burner assembly is that it can be turned axially to direct the flame to one side or the other of the channel being formed. In this way, the full force of the flame can be directed at a particularly stubborn portion of rock which otherwise would project out from the face of the channel. Furthermore, the progress of the channel can be steered in the desired direction, and changes in direction made where required.

Figure 7:
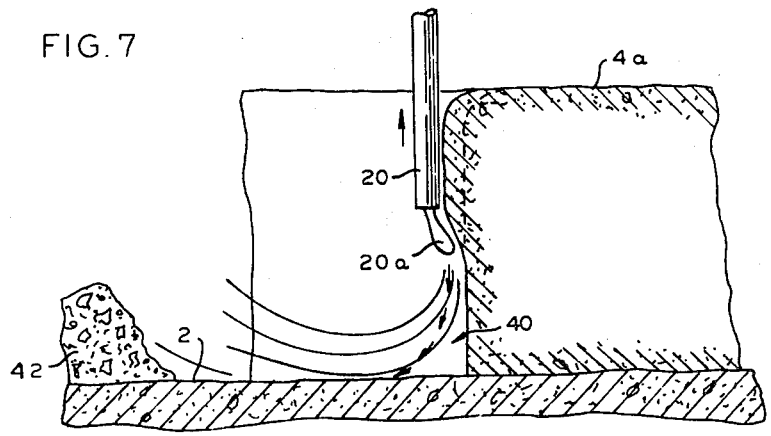
FIG. 7 is a diagrammatic view illustrating in fragmentary cross section, a body of granite having an exposed face and indicating particularly the step of upwardly directed flame cutting of the invention, to the face.

In FIG. 7, I have illustrated a portion of the rock body 4a cut away by the angled flame jet 20a, to reveal one side of a vertical cut indicated at the arrow 40. The position of flame jet 20a is intended to be illustrative of inclination within a range from 15 degrees to 30 degrees to the normal. The dotted line extending upwardly from this arrow indicates portions of rock to be removed as the flame travels upwardly. The small arrows at the lower side of the figure indicate direction of flow of the scouring gases together with entrained particles which have been fractured by thermal stressing and picked up by the gases.

At the flame working region created when the flame jet is angularly directed within the working range of angles noted, i.e. 15°–30°, a channel begins to form and, simultaneously, an important inductive effect of the invention earlier referred to is brought into action. Essentially, there is induced a channel draft consisting of a rapidly induced flow of atmospheric oxygen between the channel sides and into the low pressure, high velocity region where the flame jet leaves the burner nozzle. This flow of atmospheric oxygen exercises a beneficial effect with respect to both the burner and the flame as well as the spalled material.

With respect to the burner, an important cooling action is realized which aids materially in carrying out a continuous channelling operation, particularly as the channeled portions increase in depth.

With respect to the flame itself, the atmospheric oxygen acts to provide a controlled attenuation of the flame. As thus attenuated, the flame furnishes heat of less thermal intensity and the heat is distributed differently over contacted rock surfaces than is the case where a flame jet is used to drill a round hole vertically downwardly. Nevertheless, I find that an economically feasible rate of cutting is obtained to an extent such that vertical flame channelling is made practical. Satisfactorily large quantities of spalled material are removable in this manner. Moreover, by mixing an oil rich flame with this excess atmospheric oxygen, the flame characteristics, including its size and shape, can be desirably controlled to improve and augment the channel draft, etc.

It is further pointed out that induced air flow conducts dust and particles downwardly away from the operator station in a desirable manner. At the left side of FIG. 7 is shown a pile of discharged material 42 as accumulated by the action of the scouring gases.

It will also be noted in FIG. 7 that the top of the working face of the channel is rounded off so that a sharp corner is avoided at the top, and that the dotted line indicates that the next upward pass of the flame will maintain the rounded top to the working face. I do this to avoid spalling or other undesirable breaking off of rock segments which otherwise will result from the high concentration of natural compressive stresses which tends to occur there.

The vertical cut resulting from the action of the angled flame cutting tool has been further indicated in FIG. 4 and denoted by the numeral 10. It will be appreciated that other cuts will be formed to define the desired size of granite block to be removed for further processing.

As earlier noted, I carry out my method of angled flame cutting in such a way as to take advantage of certain natural stress patterns occurring in the rock. In FIG. 5, dotted lines, as shown, indicate approximately lines of stress forces which are well known to exist in a granite rock quarry such as the body 4a. These forces tend to be at a maximum intensity at those points at which the dotted lines approach very close to one another, for example, where they extend around the corners of the recessed area 2.

Figure 6:
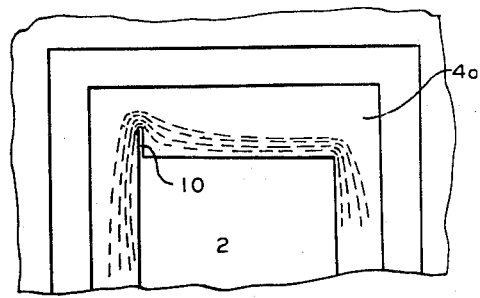
FIG. 6 is a view similar to FIG. 5, but showing in dotted lines the rearrangement of compressive stresses which takes place in the course of carrying out vertical cutting of the invention inwardly of the granite body.

I find that by progressively forming vertical cuts along lines of advancement which move horizontally inwardly, there will occur a rearrangement of the compression force line pattern and maximum compression forces will tend to be shifted ahead of the cuts and continuously concentrated in substantially the manner indicated by the lines extending around points occurring just in front of the cut 10, as suggested in FIG. 6.

The effect of this rearrangement of compression forces is to subject portions of rock just ahead of the flame cutting area to greatly augmented and localized compression forces. Where thermally induced stress is added to such localized mechanical stress, particles or chips may be fractured and dislodged at a greatly accelerated rate. In actual practice, I find that the rate of increase may be as much as two or three times as fast as ordinarily would be the case. For example, in cutting into a face where no natural compressive stress accelerates the cutting, the rate of advancement might be 20 feet, per hour, whereas cutting along lines of advancement where compressive forces are utilized in accordance with the method of this invention, the cutting rate may be as high as 60 feet per hour.

It should be understood that full advantage of this natural compression stress results from the combination of two of the unique elements of this invention—the fully open channel and the use of heat and blast. Where the channel is not kept fully open, as in the drill and broach technique where webs intervene, the webs constitute a brace to hold this compressive stress and thereby reduce its local concentration at the working end of the channel. Furthermore, concentration of pressure is a hindrance rather than a help to the conventional core drills, channel bar drills and other tools which cut by such mechanical motion as abrasion and impact. Such tools become bound and caught by the natural compression. So far as I am aware, the combination of heat and blast is the only channelling tool that is aided by these natural compression forces.

In thus combining localized natural compression forces with thermally induced stress, it is necessary, I find, to avoid extending any one vertical cut too far into the rock body as this may cause over stressing a given mass of rock. If such over stressing occurs, cracks or fissures may develop extending away from the innermost extremity of the cut and, as these cracks or faults develop, there tends to be produced pulverized material which becomes jammed upon itself so that the flame tool is ineffective to remove it.

I have discovered that by making two or more vertically disposed cuts, as, for example, cuts 10 and 12, and alternately advancing these cuts, I may control the shifting of the compression forces in some degree and avoid producing excessive stress conditions such as will produce cracking or jamming and yet a substantial localized compression can be induced and made use of to cooperate with the thermally induced fracture effect.

An important consideration which I have observed in flame cutting by thermally stressing and fracturing a crystalline body is the transfer of heat from a flame cutting tool inwardly of a rock body. I find that wherever there occurs a joint plane or bed or other discontinuity of the rock structure, heat transfer cannot take place as rapidly as it does through interrupted portions of the rock. This change in heat transfer properly induced and controlled, may be visually manifested by the rock becoming sufficiently hot so that it momentarily glows or incandesces at the region of discontinuity. In the case of heat flow, if interrupted by a joint plane, there may be made to appear a bright line of incandesence.

A further desirable procedure which may be practiced in carrying out the method of angled flame cutting of the invention, therefore, includes the steps of first forming a vertical opening which extends into a rock body for an appreciable distance, and then, utilizing this opening to look through, locating the point or points at which a desired boundary joint plane may occur. This is done by inducing, with the aid of the angled flame, a controlled incandescence of the joint plane forming portions just below the lower extremity of the tool. This enables me to determine the bed or lowermost separation plane, which is highly important in removing a desired block of granite.

In practicing my invention, a number of different arrangements may be resorted to in connection with using the flame cutting tool. For example, I may attach to the flame cutting tool a conduit form member in the form of a baffle 50 secured by clamp 51 to member 20, as shown in FIG. 9. This member 50 is designed to extend downwardly and rearwardly as shown in spaced relation to the bottom of the cut so as to define a conduit along which the scouring gases may be constrained to pass at a time when the vertical channel has progressed into the rock body for a considerable distance. Various other baffle means may be employed. Additional scouring action may be obtained by the use of a bent pipe 52 having a rearwardly facing portion to be spaced near the bottom of the channel, through which a compressed gas is introduced as shown in FIG. 9, but this has usually been found unnecessary.

While I have described the invention specifically with respect to cutting granite, it is intended that this method and apparatus may be used for cutting various other materials.

Therefore, although I have disclosed preferred embodiments of my method and apparatus, it should be understood that the invention may be modified in various other ways and practiced within the scope of the claims appended hereto.

Having thus described my invention, what I claim is:

1. Apparatus for removing material from spallable rock masses by the application of heat and spalling of the rock along a selected path to form a channel therein which comprises, an elongated blowpipe having therein an internal chamber, restricted throat and diverging discharge passage for forming and discharging a high velocity flame jet from the lower face of said blowpipe at an angle of about 15° with the axis of said blowpipe against a selected surface of a rock mass to be treated, and suspension means for raising and lowering said blowpipe in successive passes along the face of said channel while maintaining said angled flame jet in the vertical plane of said channel, said means being movable to advance said blowpipe along a selected path to be treated and into said mass along the channel formed therein by removal of said material therefrom by spalling.

2. A method of flame channeling by removing material from spallable rock masses, which consists in burning fluid fuel with an oxidant to form a flame, directing the flame in a generally downward direction but inclined from the vertical against the generally vertical end face of the rock mass to be channeled, said vertical end face constituting the end wall of a continuous open channel which forms a narrow passage in the rock body, said passage being open to the atmosphere and being bounded by generally parallel faces as well as by said end wall, raising and lowering the flame in successive passes along the substantially vertical end wall of the channel while maintaining the flame in the vertical plane of the channel, advancing the flame along a selected path to be treated and into said mass along the channel formed therein by removal of material therefrom by spalling, and continuing the channeling process inwardly for the distance corresponding to the part of the rock which is to be separated from the rock mass.

3. A method of flame channeling a rock mass according to claim 2 in which the angle of the flame with respect to the generally vertical end wall of the channel is about 15°.

4. A method of flame channeling according to claim 2, in which two channels are formed, each by the method defined in said claim, the flames in the two channels being advanced alternately to control the shifting of the natural compression forces in the rock mass.

References Cited in the file of this patent

UNITED STATES PATENTS

| | | |
|---|---|---|
| 1,901,428 | Anderson | Mar. 14, 1933 |
| 2,111,872 | Rea | Mar. 22, 1938 |
| 2,288,026 | Rea | June 30, 1942 |
| 2,356,196 | Barnes et al. | Aug. 22, 1944 |
| 2,426,688 | Higgs | Sept. 2, 1947 |
| 2,655,909 | Aitchison et al. | Oct. 20, 1952 |
| 2,675,993 | Smith et al. | Apr. 20, 1954 |
| 2,675,994 | Smith et al. | Apr. 20, 1954 |
| 2,738,162 | Aitchison | Mar. 13, 1956 |